(12) United States Patent
Zhang et al.

(10) Patent No.: US 11,264,797 B2
(45) Date of Patent: Mar. 1, 2022

(54) OVERVOLTAGE PROTECTIVE DEVICE FOR LIGHTNING PROTECTION

(71) Applicant: CHENGDU TIEDA ELECTRONICS CORP., Sichuan (CN)

(72) Inventors: Zhicheng Zhang, Sichuan (CN); Lei Ye, Sichuan (CN); Jungu Zhan, Sichuan (CN); Jun Zhang, Sichuan (CN); Xiaolong Shi, Sichuan (CN)

(73) Assignee: CHENGDU TIEDA ELECTRONICS CORP., Chengdu (CN)

( * ) Notice: Subject to any disclaimer, the term of this patent is extended or adjusted under 35 U.S.C. 154(b) by 0 days.

(21) Appl. No.: 16/975,135

(22) PCT Filed: Jul. 1, 2019

(86) PCT No.: PCT/CN2019/094123
§ 371 (c)(1),
(2) Date: Aug. 23, 2020

(87) PCT Pub. No.: WO2020/011039
PCT Pub. Date: Jan. 16, 2020

(65) Prior Publication Data
US 2020/0403402 A1 Dec. 24, 2020

(30) Foreign Application Priority Data

Jul. 12, 2018 (CN) .......................... 201810768461.1
Sep. 6, 2018 (CN) .......................... 201811040608.1

(51) Int. Cl.
*H01C 7/02* (2006.01)
*H02H 9/04* (2006.01)
(Continued)

(52) U.S. Cl.
CPC ............... *H02H 9/045* (2013.01); *H01C 7/02* (2013.01); *H01C 7/12* (2013.01); *H02H 9/04* (2013.01);
(Continued)

(58) Field of Classification Search
CPC .......... H02H 9/04; H02H 9/045; H02H 9/042; H02H 1/00; H02H 3/22; H02H 1/04;
(Continued)

(56) References Cited

U.S. PATENT DOCUMENTS 6,188,557 B1* 2/2001 Chaudhry ................ H02H 9/06
361/111
8,854,786 B2* 10/2014 Fu ............................ H02H 9/04
361/117

FOREIGN PATENT DOCUMENTS

| CN | 1581626 A | 2/2005 |
| CN | 103346547 A | 10/2013 |
| TW | I231078 B | 4/2005 |

OTHER PUBLICATIONS

International Search Report of PCT Patent Application No. PCT/CN2019/094123 dated Sep. 29, 2019.

* cited by examiner

*Primary Examiner* — Danny Nguyen

(57) ABSTRACT

Disclosed in the present invention is a novel overvoltage protective device for lightning protection, comprising a first varistor, a second varistor, a PTC Thermistor, and lead-out terminals. The first varistor and the PTC Thermistor are connected in parallel, and then further connected in series with the second varistor to form a single port combined circuit. The surge-withstand capability of the first varistor is higher than the surge-withstand capability of the second varistor. At least one of the two lead-out terminals of the single port combined circuit is a thermally-conductive end (Continued)

with low thermal resistance. The second varistor is thermally coupled to the PTC Thermistor. The thermally-conductive end with low thermal resistance is thermally coupled to one or both of the second varistor and the PTC Thermistor.

18 Claims, 6 Drawing Sheets

(51) Int. Cl.
     *H01C 7/12*          (2006.01)
     *H01C 7/102*        (2006.01)
     *H02H 1/04*         (2006.01)
     *H02H 9/06*         (2006.01)
     *H02H 3/22*         (2006.01)

(52) U.S. Cl.
     CPC .............. *H02H 9/042* (2013.01); *H01C 7/102* (2013.01); *H02H 1/04* (2013.01); *H02H 3/22* (2013.01); *H02H 9/06* (2013.01)

(58) Field of Classification Search
     CPC ... H02H 9/06; H01C 7/02; H01C 7/12; H01C 7/102; H01C 1/1406
     USPC .................................................. 361/117–120
     See application file for complete search history.

OVERVOLTAGE PROTECTIVE DEVICE FOR LIGHTNING PROTECTION

FIELD OF THE INVENTION

The invention relates to the field of power sources, and in particular to a novel overvoltage protective device for lightning protection.

BACKGROUND OF THE INVENTION

Surge Protective Device (SPD for short), as a standard low-voltage electrical appliance, is widely used in low-voltage power lines. It can effectively suppress the surge caused by lightning or other origins. SPD has a significant role in improving the power quality and ensuring the safety of electrical appliances.

The core of SPD are surge suppression components, and common used ones are varistors. During the lifecycle of SPD, varistor is more likely to suffer repeated surges exceeding the rating specification, resulting in the risk of varistor breakdown in short-circuit failure mode. Once this kind of breakdown occurs, it will cause a short-circuit failure of the power line. The breakdown point will be cracked, smoking, arcing, and even cause fire and combustion in serious cases.

The first improvement scheme is the most commonly used method. The schematic diagram is shown in FIG. 1. On the two electrodes of the varistor A1, a piece of thin copper sheet electrode A2 with excellent electrical and thermal conductivity is soldered respectively. The thin copper sheet electrode A2 is prefabricated with a lead-out terminal A3, and the thin copper sheet electrode A2 functions as a conductive electrode and also forms a thermal coupling with the varistor A1 to conduct the heat generated by the varistor A1 to the lead-out terminal A3. An elastic metal sheet A4 is soldered on one of the lead-out terminals A3 with a low-melting alloy A5 to form a thermal disconnector. When the leakage current of varistor A1 degrades to milliampere-level, it enters the accelerated degradation stage. The leakage current causes the varistor A1 to heat up, and the heated varistor A1 causes the leakage current to increase further in turn, which creates a vicious circle. The process will eventually cause the varistor A1 to thermally break down. When the heat reaches the melting point of the low-melting alloy A5, the thermal disconnector cuts off the power supply, so that the varistor A1 exits the power grid before the short-circuit occurs, thereby achieving the purpose of protection. This solution can convert the failure mode of the varistor A1 from short-circuit mode to open-circuit mode which greatly improves the safety of the SPD.

However, there are still some shortcomings in this solution. It takes several seconds for the thermal disconnector to act by its operating principle. When the leakage current of the varistor A1 starts accelerated degradation and heating, the defects inside the ceramic body of the varistor A1 are already serious. Some defects are serious enough to make the time very short from the start of heating to the short-circuit breakdown. Short-circuit fault occurs before enough heat being conducted to the thermal disconnector to melt the low-melting alloy A5. Another common situation is when the varistor A1 deteriorates to the vicinity of the accelerated degradation stage. The leakage current of the varistor A1 is still less than the milliamp level. The varistor can maintain thermal stability and work under the operating voltage of the power grid. But the value of varistor voltage has been significantly lower than the initial value when it was first put into use. The surge-withstand capability of the varistor A1 is already weak. An ordinary surge can break it down. In this case, the short-circuit speed is too fast for the thermal disconnector to respond for protection.

The second improvement scheme is the Chinese invention patent with the application number of 201310268111.6. The schematic diagram is shown in FIG. 2. A PTC thermistor (positive temperature coefficient thermistor) B12 is connected in parallel with a GDT (gas discharge tube) 13 and then connected with a varistor B11 in series. The PTC thermistor B12 and the varistor B11 are soldered together to form a thermal coupling. The lead-out terminal 14 and the lead-out terminal 15 are connected to the protected power line in parallel. After the lead wires are soldered, they are encapsulated and cured by epoxy resin to form an encapsulation layer 16. When the varistor B11 degrades to the accelerated degradation stage, the temperature of PTC thermistor B12 elevates because of the heat conducted from the varistor B11. The elevated temperature results in the increase of its resistance value, which leads to the reduction of leakage current flowing into the varistor B11 in turn. This process helps to prolong the degradation time. After the temperature of the PTC thermistor B12 reaches the Curie temperature point, it shifts into a high resistance state, which limits the increase of the leakage current. The varistor B11 is forced to reach thermal equilibrium around the Curie temperature point, and can keep working under the operating voltage of the power grid.

However, this solution still has some serious shortcomings. First of all, due to the current limiting effect of the PTC thermistor B12, regardless of how seriously the varistor B11 deteriorates, the temperature of the varistor B11 is kept around the Curie temperature point of the PTC thermistor B12. When the varistor voltage of the varistor B11 drops to about one half of the peak value of the grid's operating voltage due to the deterioration, plus the GDT 13 begins conduction because of a surge impulse, the follow-on current cannot be disconnected due to the low voltage value of the varistor B12, which causes the GDT 13 to fail to return to the open circuit state. This will short the PTC thermistor B12, and the varistor B11 will breakdown immediately because of the short circuit, causing the protective circuit failed. Theoretically, most varistors will fail in this way if there are no other protective measures. The other failure process is similar to that in the first scheme, that is, when the varistor B11 deteriorates to a certain degree, even if it has not entered the accelerated degradation stage, its internal structure has been damaged, and its surge-withstand capability has been compromised. In this case, a surge can make it break down or close to breakdown. In the meanwhile, the GDT 13 is also in the conducting state. But the varistor B11 has lost the ability to block the follow-on current in the power grid, resulting in the short-circuit fault.

SUMMARY OF THE INVENTION

The purpose of the present invention is to overcome the above-mentioned shortcomings existing in the prior art, and provide a novel overvoltage protective device for lightning protection.

In order to achieve the above-mentioned object, the present invention provides the following technical solutions:

A novel overvoltage protective device for lightning protection includes a first varistor, a second varistor, a PTC Thermistor (positive temperature coefficient thermistor), and lead-out terminals. The first varistor and the PTC Thermistor are connected in parallel, and then further connected in series with the second varistor to form a single port combined circuit. The surge-withstand capability of the first varistor is higher than the surge-withstand capability of the second varistor;

at least one of the two leading-out terminals of the one-port combined circuit is a thermally-conductive terminal with low thermal resistance. The second varistor is thermally coupled to the PTC Thermistor. The thermally-conductive terminal with low thermal resistance is thermally coupled to one or both of the second varistor and the PTC Thermistor. When in use, a thermal disconnector is connected to the thermally-conductive terminal with low thermal resistance, and the Curie temperature point of the PTC Thermistor is higher than the operating temperature of the thermal disconnector.

The working principle of the present invention is analyzed as follows:

The sub-circuit composed of the first varistor and the second varistor connected in series is the main channel for absorbing surge. When there is no surge, both varistors are in high-resistance state. When a surge arrives, both varistors are in low-resistance state, and surge energy is discharged through this sub-circuit. At this time, the voltage limiting level of the SPD can be considered as the sum of the residual voltage of the first varistor and the second varistor. After the surge disappears, both varistors return to a high-impedance state. In order to ensure that the degradation of components in the channel starts from the second varistor, the principle that the surge-withstand capability of the first varistor is greater than that of the second varistor shall be followed, so as to achieve the purpose that the first varistor is basically intact when the second varistor has significantly deteriorated and the thermal protection circuit starts to work.

The other sub-circuit composed of the second varistor and the PTC Thermistor connected in series is a thermal protection sub-circuit. This sub-circuit is also connected to the thermal disconnector through a thermally conductive terminal. At room temperature, the PTC Thermistor has a resistance value of tens to hundreds of ohms. When there is no surge coming, the sub-circuit is in the high resistance state, and the leakage current flowing through is small (microampere level). When there is a surge coming, the voltage applied on the PTC Thermistor is limited to the residual voltage of the first varistor connected in parallel. In the meantime, the first varistor is in the state of conducting and surge-absorbing. Its resistance can be as low as a few tenths of an ohm. Most of the surge current passes through the first varistor, and the surge current flowing through the PTC Thermistor is at most ampere level. During the short interval of the surge, the heat generated by the PTC Thermistor is not strong enough to trigger the thermal protection sub-circuit to work.

The failure mechanism analysis of the present invention is as follows:

When the second varistor degrades until the leakage current reaches the milliamp level, it enters the accelerated degradation stage. The heat generated by the second varistor is conducted to the PTC Thermistor by the thermal coupling, and makes the temperature of the PTC Thermistor elevated. The elevated temperature makes the resistance value of the PTC Thermistor to rise, and finally reaches thermal equilibrium around the Curie temperature point. The leakage current is clamped to a small value, so that the degradation process of the second varistor can be lengthened. With the sufficient time, the heat can be conducted from the thermally-conductive terminal to the thermal disconnector, and the temperature can reach around the Curie temperature. The operating temperature of the thermal disconnector is set lower than the Curie temperature to ensure the thermal disconnector to act. The solution can make most of the degraded SPDs exit the power grid in this safe manner.

For those special cases, that is, when the second varistor is degraded to a certain degree or is already in the accelerated degradation stage, its surge-withstand capability has been greatly reduced. A strong surge will directly or nearly break it. When the surge disappears, the first varistor that is basically intact can still be kept in a high-impedance state due to its stronger surge-withstand capability. It can maintain thermal stability without significant degradation, and provide sufficient response time for the thermal protection sub-circuit. At this time, the operating voltage of the power grid will be applied to the two ends of the PTC Thermistor. It can still generate heat to make the temperature of itself reach to the Curie temperature point and cause the thermal disconnector to operate. The device will operate to cut off the power supply, so that the damaged SPD can safely exit the power grid. Because the thermal disconnector is generally provided with a status indicator or an electric, acoustic, or light alarm device, it will soon be found, and maintenance personnel can easily replace it, achieving the purpose of safe use. As a result, the safety and reliability of SPD is greatly improved, and the failure rate of electrical equipment connected on the line will be greatly reduced.

It should be noted that, in the thermal protection sub-circuit, the second varistor and the PTC Thermistor do not necessarily form a thermal coupling. After selecting components with the appropriate parameters, the heat generated by the second varistor or the PTC Thermistor respectively can also trigger the operation of the thermal disconnector and achieve the purpose of the invention.

Further, the PTC Thermistor can be replaced with a resistor with linear characteristics, i.e. the current flowing through the resistor is substantially proportional to the voltage applied on it. Its characteristic equation is mainly homogeneous linear, and complies with Ohm's law. The resistor with linear characteristics can play the following roles in the thermal protection sub-circuit: First, the current limiting effect. When the second varistor deteriorates or even breaks through a short circuit, the resistor with linear characteristics can limit the current in the thermal protection sub-circuit within the safe range, avoiding the short-circuit damage of the overvoltage protection device. Second, the heating effect. The current within the safe range flowing through the second varistor and the resistor with linear characteristics will make them heat up to trigger the thermal disconnector to act, and the purpose of thermal protection can also be achieved. In order to achieve the above effect, the current flowing through the thermal protection sub-circuit is preferably tens of milliamperes to several amperes in the most unfavorable case (the second varistor is short-circuited), and the resistance value of the corresponding resistor with linear characteristics is several thousand ohms to tens of ohms.

In the present invention, the resistors with linear characteristics include both linear resistors and resistors with certain portion of non-linearity (the non-linear portion should be minor enough to characterize the resistor mainly by Ohm's Law). Its power must be large enough and its withstand voltage should be high enough. At least the resistor must not fail before the operation of the thermal disconnector.

Preferably, the first varistor electrode surface's area of the first varistor is larger than second varistor electrode surface's area of the second varistor. There are a number of technical indicators for measuring the surge-withstand capability of a varistor. The most important are: the impulse discharge current $I_{imp}$ with a current waveform of 10/350 μs; the maximum discharge current $I_{max}$ with a current waveform of 8/20 μs; the maximum energy with a current waveform of 2 ms square wave; the current surge withstand capability, which is the number of times that it can withstand repeated impact with the nominal discharge current In of 8/20 μs waveform. These technical indicators are directly proportional to the electrode area of the varistor. Therefore, under the same process conditions, as long as the electrode area of the first varistor is larger than that of the second varistor, the surge withstand capability of the first varistor can be ensured to be better than that of the second varistor.

Preferably, the nominal diameter of the first varistor is at least one serial number larger than the nominal diameter of the second varistor. Because the diameter ratio of the adjacent serial numbers is about 1.25 times, the difference between their surge-withstand capability is about 1.5 times. As long as the second varistor is designed to match the requirement of the application scenario, the first varistor is a redundant design. The failure rate of the first varistor will be reduced by an order of magnitude compared to the second varistor, which can ensure that the second varistor is degraded first.

Preferably, the varistor voltage value of the first varistor is 0.9 to 1.1 times the peak value of the operating voltage. It can be guaranteed that in the case of the second varistor completely broken down and short-circuited, the first varistor can also return to a high-impedance state after the surge disappears. It can still maintain thermal stability and provide sufficient response time for the thermal protection sub-circuit to act. If the varistor voltage value of the first varistor is selected too low, thermal stability cannot be reliably maintained in this case; when it is selected too high, the limiting voltage of the single-port overvoltage protection device will be increased, which compromises the protection level.

Specifically, when the 220V power grid is connected, the varistor voltage value of the first varistor is 280V-342V; when the 110V power grid is connected, the varistor voltage value of the first varistor is 140V-171V; when 380V power grid is connected, the varistor voltage value of the first varistor is 484V-591V.

Preferably, one electrode of the second varistor is connected with the one electrode of the PTC Thermistor and one electrode of the first varistor. The other electrode of the PTC Thermistor is connected with the other electrode of the first varistor. The second varistor and/or the PTC Thermistor is also soldered with a thermally-conductive end with low thermal resistance, to achieve thermal coupling of the components. For the connection of components, direct soldering between the electrode surfaces is preferred, and internal connection lines or support structures with thermal and electrical conductivity are minimized.

Preferably, the low-thermal-resistance terminal is made of a material with excellent thermal conductivity such as copper, and has a sufficiently large cross-sectional area. It is connected to a heating source (such as a varistor or a PTC Thermistor) by thermal coupling such as soldering, and the distance between the thermal conductive end and the heating source should be as short as possible to obtain the lowest thermal resistance and ensure sufficient heat is conducted to the thermal disconnector.

Preferably, the second varistor, the PTC Thermistor, and the first varistor are packaged as a whole.

Preferably, the first varistor is formed by connecting two varistor disks of the same size in parallel.

Preferably, one electrode surface of the second varistor is connected to one electrode of the first varistor through a conductive support; one electrode of the PTC Thermistor is connected to the other electrode of the first varistor through an internal connection line.

Preferably, the nominal discharge current of the first varistor is higher than the nominal discharge current of the second varistor.

The invention also discloses a novel overvoltage protective device for lightning protection, which includes a first varistor, a second varistor, a PTC Thermistor, and lead-out terminals. The first varistor and the PTC Thermistor are connected in parallel, and then further connected in series with the second varistor to form a single port combined circuit. The surge-withstand capability of the first varistor is higher than the surge-withstand capability of the second varistor;

at least one of the two lead-out terminals of the single port combined circuit is a thermally-conductive end with low thermal resistance. The thermally-conductive end with low thermal resistance is thermally coupled to one or both of the second varistor and the PTC Thermistor.

Compared with the prior art, the beneficial effects of the present invention are:

The invention includes a main channel for absorbing surge composed of a first varistor and a second varistor in series, and a thermal protection channel composed of a second varistor and a PTC Thermistor in series as well. Under normal and special failure conditions, the SPD's thermal disconnector will act to cut off the power, so that the SPD eventually exits the circuit in open circuit mode. Compared with the traditional short circuit mode, it greatly improves the safety of the SPD and prevents the accidents of smoke, arcing, even fire and combustion when the short circuit occurs. At the same time, the status indicator or electric, acoustic, or light alarm device on the thermal disconnector helps to find the damaged SPD, and the maintenance personnel can easily replace it, achieving the purpose of safe use. As a result, the safety and reliability of SPD is greatly improved, and the failure rate of electrical equipment will be greatly reduced.

Figure 1:
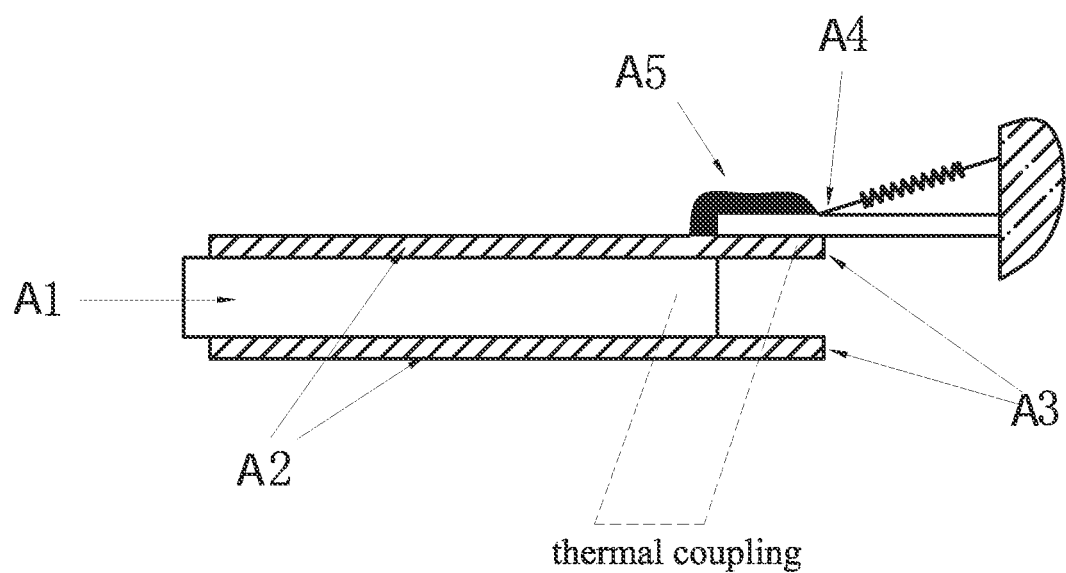
FIG. 1 is a schematic diagram of the first improvement scheme according to the background art.

Marked in FIG. 1: A1—varistor, A2—thin copper sheet electrode, A3—lead-out terminals, A4—elastic metal sheet, A5—low-melting alloy.

Figure 2:
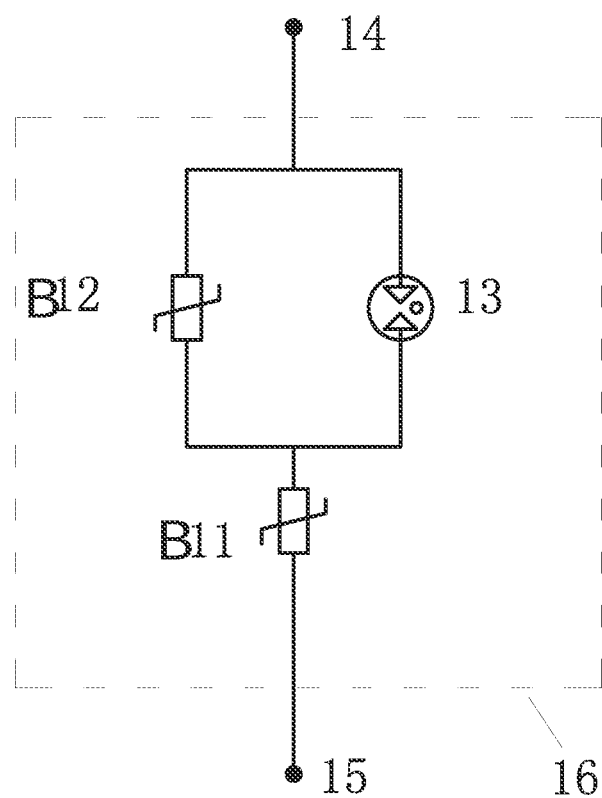

FIG. 2 is a schematic diagram of the second improvement scheme according to the background art.

Marked in FIG. 2: B11—varistor, B12—PTC thermistor, 13—GDT, 14—lead-out terminal, 15—lead-out terminal, 16—encapsulation layer.

Figure 3:
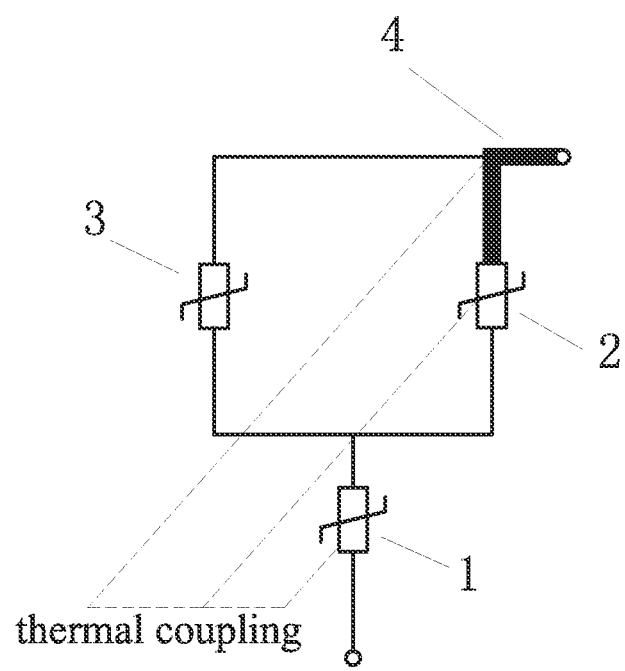

FIG. 3 is a schematic diagram of a novel overvoltage protective device for lightning protection according to one embodiment of the present invention.

Figure 4:
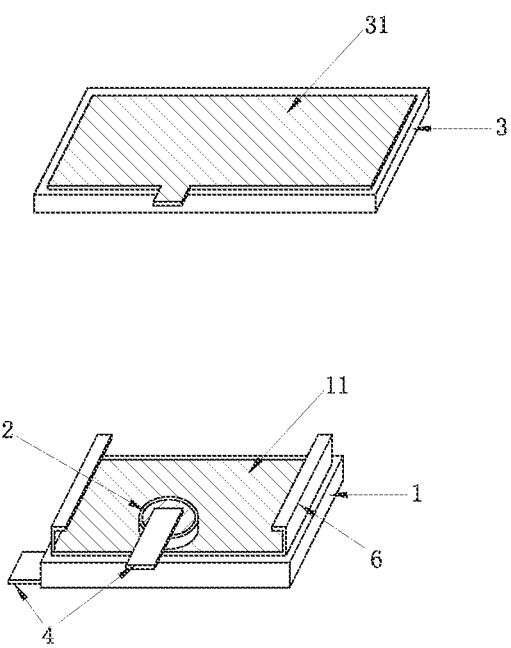

FIG. 4 is a part diagram of a novel overvoltage protective device for lightning protection according to Embodiment 1 of the present invention.

Figure 5:
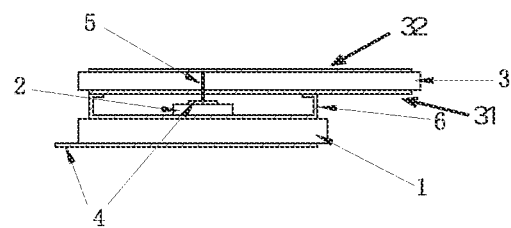

FIG. 5 is an assembly diagram of a novel overvoltage protective device for lightning protection according to Embodiment 1 of the present invention.

Figure 6:
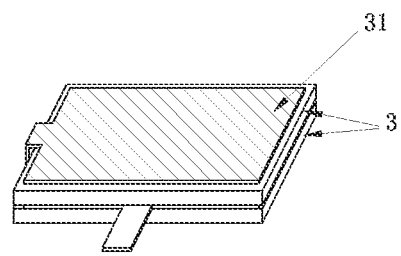
Figure 6:
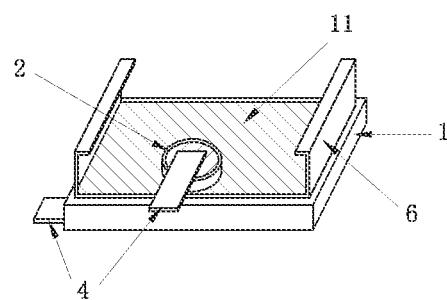

FIG. 6 is a part diagram of a novel overvoltage protective device for lightning protection according to Embodiment 2 of the present invention.

Figure 7:
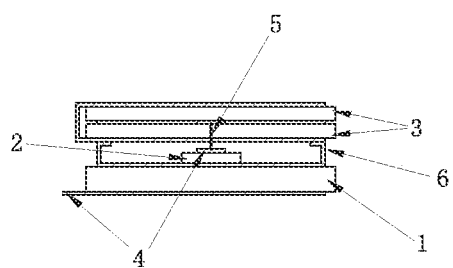

FIG. 7 is an assembly diagram of a novel overvoltage protective device for lightning protection according to Embodiment 2 of the present invention.

Marked in FIGS. 3 to 7: 1—second varistor, 11—second varistor electrode surface, 2—PTC Thermistor, 3 first varistor, 31 first varistor electrode surface, 32 second electrode surface of the first varistor, 4 lead-out terminal, 5—internal connection line, 6—conducitive support.

DETAILED DESCRIPTION OF ILLUSTRATED EMBODIMENTS

The present invention will be further described in detail below with reference to test examples and specific embodiments. However, it should not be understood that the scope of the above subject matter of the present invention is limited to the following embodiments, and any technology implemented based on the content of the present invention belongs to the scope of the present invention.

Embodiment 1

As shown in FIG. 3-5, a novel overvoltage protective device for lightning protection includes a first varistor 3, a second varistor 1, a PTC Thermistor 2, and lead-out terminals 4. The first varistor 3 and the PTC Thermistor 2 are connected in parallel, and then further connected in series with the second varistor 1 to form a single port combined circuit. The surge-withstand capability of the first varistor 3 is higher than the surge-withstand capability of the second varistor 1;

at least one of the two lead-out terminals 4 of the single port combined circuit is a thermally-conductive end with low thermal resistance. The second varistor 1 is thermally coupled to the PTC Thermistor 2. The thermally-conductive end with low thermal resistance is thermally coupled to the second varistor 1, and the thermally-conductive end with low thermal resistance is thermally coupled to the PTC Thermistor 2. When in use, a thermal disconnector is connected to the thermally-conductive end with low thermal resistance, and the Curie temperature point of the PTC Thermistor 2 is higher than the operating temperature of the thermal disconnector.

First varistor electrode surface's 31 area of the first varistor 3 is larger than second varistor electrode surface's 11 area of the second varistor 1, and the nominal diameter of the first varistor 3 is at least one serial number larger than the nominal diameter of the second varistor 1, and the varistor voltage value of the first varistor 3 is 0.9 to 1.1 times the peak value of the operating voltage of the connected power grid.

The specific assembly method is:

The first varistor 3 is a rectangular varistor disk 50k301 with a nominal diameter of 50 mm, a varistor voltage of 300 volts, and a maximum discharge current Imax of 60 KA. The second varistor 1 is a square varistor disk 40k391 with a nominal diameter of 40 mm, a varistor voltage of 390 volts, and a maximum discharge current Imax of 40 KA. The PTC Thermistor 2, of which the diameter is 12 mm, possesses a Curie temperature of 160° C., and a resistance value of 150 ohms at room temperature. The operating temperature of the thermal disconnector is 120° C. The characteristics of these components are selected to be suitable for working in the power grid with power frequency voltage 220V.

One second varistor electrode surface 11 of the second varistor 1 is soldered to the PTC Thermistor 2 and connected to a first electrode 31 of the first varistor 3 through a conductive support 6. The conductive support 6 is a support structure with thermal and electrical conductivity. The other electrode of the PTC Thermistor 2 is connected with a second electrode surface 32 of the first varistor 3 through an internal connection line 5. The second varistor1 and/or the PTC Thermistor 2 is also soldered with a thermally-conductive end with low thermal resistance, and on the thermally-conductive end with low thermal resistance, a thermal disconnector is formed by soldering an elastic metal sheet with a low melting point alloy. The second varistor 1, the PTC Thermistor 2, and the first varistor 3 are packaged as a whole.

Connect the device to a power line with power frequency voltage 220V, and apply a repeated surge of In=20 KA. After the 86th impulse, the thermal disconnector acts. Test the varistor voltage value of the second varistor 1 after cooling to room temperature. It has deteriorated to 224 volts, while the varistor voltage of the first varistor 3 is still 298 volts, which remains basically unchanged.

Embodiment 2

As shown in FIG. 6 to FIG. 7, this embodiment is different from Embodiment 1 in that the first varistor 3 is formed by the same two square varistor disks (40K301×2) connected in parallel, of which the nominal diameters are 40 mm. This is the conventional way adopted by the industry to reduce the installation footprint. The varistor voltage of the first varistor 3 is 300 volts and the maximum discharge current Imax is 80 KA. The second varistor 1 is a square varistor 40K391 with a nominal diameter of 40 mm, a varistor voltage of 390 volts and a maximum discharge current Imax of 40 KA. The PTC Thermistor 2, of which the diameter is 12 mm, possesses a Curie temperature of 160° C., and a resistance value of 150 ohms at room temperature. The operating temperature of the thermal disconnector is 120° C. The characteristics of these components are selected to be suitable for working in the power grid with power frequency voltage 220V.

Connect the device to a power line with power frequency voltage 220V, and apply a repeated surge of In=20 KA. After the 101th impulse, the thermal disconnector acts. Test the varistor voltage value of the second varistor 1 after cooling to room temperature. It has deteriorated to 256 volts, while the first varistor 3 is still 299 volts, which remains basically unchanged.

The above embodiments are only used to illustrate the present invention and not to limit the technical solutions described in the present invention. Although the present invention has been described in detail with reference to the above embodiments, the present invention is not limited to the above specific implementations; and all technical solutions and improvements that do not depart from the spirit and scope of the invention shall be covered by the claims of the present invention.

What is claimed is:

1. An overvoltage protective device for lightning protection, comprising a first varistor (3), a second varistor (1), a PTC thermistor (2), and two lead-out terminals (4), and the first varistor (3) and the PTC thermistor (2) are connected in parallel, and then further connected in series with the second varistor (1) to form a single port combined circuit, and surge-withstand capability of the first varistor (3) is higher than surge-withstand capability of the second varistor (1);

Wherein the single port combined circuit comprises at least one of the two lead-out terminals (4) being thermally-conductive end with low thermal resistance, and the second varistor (1) is thermally coupled to the PTC thermistor (2), and the thermally-conductive end with low thermal resistance is thermally coupled to one or both of the second varistor (1) and the PTC thermistor (2).

2. The overvoltage protective device for lightning protection according to claim 1, wherein a first electrode surface area (31) of the first varistor (3) is larger than a second electrode surface area (11) of the second varistor (1).

3. The overvoltage protective device for lightning protection according to claim 1, wherein a nominal diameter of the first varistor (3) is at least one serial number larger than a nominal diameter of the second varistor (1).

4. The overvoltage protective device for lightning protection according to claim 1, wherein a voltage value of the first varistor (3) is 0.9 to 1.1 times peak value of an operating voltage of a connected power grid.

5. The overvoltage protective device for lightning protection according to claim 1, wherein a second electrode surface (11) of the second varistor (1) is connected with one electrode of the PTC thermistor (2) and a first electrode (31) of the first varistor (3), other electrode of the PTC thermistor (2) is connected with a second electrode (32) of the first varistor (3), and the second varistor (1) and/or the PTC thermistor (2) is also soldered with a thermally-conductive end with low thermal resistance.

6. The overvoltage protective device for lightning protection according to claim 5, wherein, the second varistor (1), the PTC thermistor (2), and the first varistor (3) are packaged as a whole.

7. The overvoltage protective device for lightning protection according to claim 1, wherein, the rated value of the impulse discharge current of the first varistor (3) is higher than the rated value of the impulse discharge current of the second varistor (1).

8. The overvoltage protective device for lightning protection according to claim 1, wherein when a power grid with a power frequency voltage 220V is connected, the voltage value of the first varistor (3) is 280V-342V; when the power grid with a power frequency voltage 110V is connected, the voltage value of the first varistor (3) is 140V-171V; when the power grid with a power frequency voltage 380V is connected, the voltage value of the first varistor (3) is 484V-591V.

9. An overvoltage protective device for lightning protection, comprising a first varistor (3), a second varistor (1), a PTC thermistor (2), and two lead-out terminals (4), and the first varistor (3) and the PTC thermistor (2) are connected in parallel, and then further connected in series with the second varistor (1) to form a single port combined circuit, and the surge-withstand capability of the first varistor (3) is higher than the surge-withstand capability of the second varistor (1);

Wherein the single port combined circuit comprises at least one of the two lead-out terminals (4) being thermally-conductive end with low thermal resistance, and the second varistor (1) is thermally coupled to the PTC thermistor (2), and the thermally-conductive end with low thermal resistance is thermally coupled to one or both of the second varistor (1) and the PTC thermistor (2).

10. The overvoltage protective device for lightning protection according to claim 1, wherein the PTC thermistor (2) can be replaced with a resistor with linear characteristics.

11. The overvoltage protective device for lightning protection according to claim 2, wherein the PTC thermistor (2) can be replaced with a resistor with linear characteristics.

12. The overvoltage protective device for lightning protection according to claim 3, wherein the PTC thermistor (2) can be replaced with a resistor with linear characteristics.

13. The overvoltage protective device for lightning protection according to claim 4, wherein, the PTC thermistor (2) can be replaced with a resistor with linear characteristics.

14. The overvoltage protective device for lightning protection according to claim 5, wherein the PTC thermistor (2) can be replaced with a resistor with linear characteristics.

15. The overvoltage protective device for lightning protection according to claim 6, wherein the PTC thermistor (2) can be replaced with a resistor with linear characteristics.

16. The overvoltage protective device for lightning protection according to claim 7, wherein the PTC thermistor (2) can be replaced with a resistor with linear characteristics.

17. The overvoltage protective device for lightning protection according to claim 8, wherein the PTC thermistor (2) can be replaced with a resistor with linear characteristics.

18. The overvoltage protective device for lightning protection according to claim 9, wherein the PTC thermistor (2) can be replaced with a resistor with linear characteristics.

* * * * *